Figure 1:
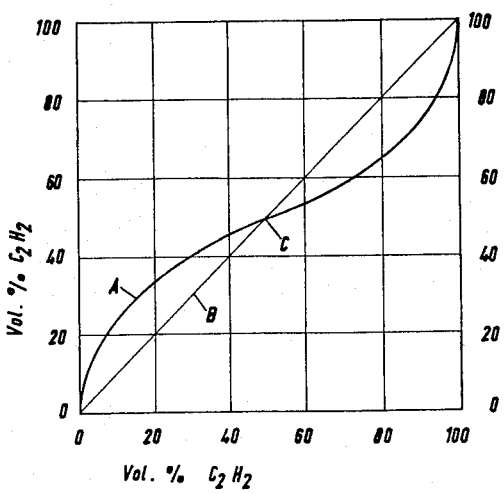

July 12, 1966  R. BECKER  3,260,057
TWO STAGE RECTIFICATION PROCESS FOR SEPARATING A MIXTURE OF
ETHANE, ETHYLENE AND ACETYLENE
Filed July 5, 1961  2 Sheets-Sheet 1

Inventor
RUDOLF BECKER

By Toulmin & Toulmin
Attorneys

3,260,057
TWO STAGE RECTIFICATION PROCESS FOR SEPARATING A MIXTURE OF ETHANE, ETHYLENE AND ACETYLENE
Rudolf Becker, Munich-Solln, Germany, assignor to Linde Aktiengesellschaft
Filed July 5, 1961, Ser. No. 121,963
Claims priority, application Germany, July 30, 1960, G 30,202
8 Claims. (Cl. 62—17)

The present invention relates to a process and to an apparatus for separating ternary mixtures wherein two components form an azeotropically boiling mixture, more particularly, to the separation of $C_2$ hydrocarbon mixtures by means of a rectification at low temperature in order to obtain ethane and ethylene free from acetylene.

In general, ternary mixtures comprising azeotropically boiling mixtures cannot be completely separated by rectification. One such example of a mixture is the $C_2$ hydrocarbon fraction consisting of ethane, ethylene and acetylene. This fraction is obtained in a relatively simple process by a rectification of gaseous mixtures such as coke-oven gas, thermally cracked gas, converter gas and the like.

Since acetylene and ethane form an azeotropically boiling mixture it has not been previously possible to obtain all the components of this ternary mixture in a pure condition through a rectification process. A specific problem has been to eliminate the acetylene completely from the ethylene. The presence of any acetylene with the ethylene is a serious drawback for further treatment of the ethylene.

In the rectification of a $C_2$ hydrocarbon mixture in an ethylene-ethane rectification column the acetylene in the lower part of the column is pushed upwardly and the acetylene in the upper portion of the column is pushed downwardly. The equilibrium differences between ethylene and acetylene are relatively small so that some acetylene usually appears in the ethylene. The attempt to balance or compensate the acetylene against ethane will not succeed because such an attempt would result in a considerable loss in the ethylene. Accordingly, the acetylene is removed by washing with acetone or other selective solvents either before or after the rectification process.

It is the principal object of this invention to provide a novel and improved process for separating ternary mixtures by rectification at low temperature, said ternary mixture containing binary mixtures which by themselves would form azeotropes.

It is another object of this invention to provide a process and an apparatus wherein the components of a difficult to separate ternary mixture can be separated solely by rectification without being washed and by which it is possible to produce ethylene free from acetylene from a $C_2$ hydrocarbon mixture.

The process of this invention essentially comprises withdrawing from a suitable point in the rectification column a mixture which contains all of the three components with the non-azeotropic component in preponderant amounts and the other two components in a particular proportion. This proportion is such that in a further rectification of this mixture the two azeotropic components can be separated before reaching the azeotropic point and, further, the non-azeotropic component contains only one of the two other components.

In the practice of this invention preferably a liquid mixture is withdrawn from the upper portion of the $C_2$ rectification column which mixture consists essentially of ethylene and contains some ethane and acetylene. This liquid mixture is then rectified in a second rectification column. The acetylene can be enriched to any desired degree in the sump of the second column. A mixture is discharged from the top of the second column which mixture has substantially the same composition as the original mixture except that the acetylene content has been reduced by the amount of the acetylene removed therefrom, i.e., the ratio of ethylene to ethane remains the same.

Since the ethane-acetylene equilibrium curve is anomalous, the acetylene will represent the higher boiling substance in higher concentrations of acetylene and the ethane will comprise the high boiling substance in lower concentrations of acetylene. If a mixture is taken from the lower portion of the rectification column and rectified in a second column, this second rectification will yield pure ethane in the sump of the column. However, there would be no acetylene.

The principal advantage of this invention is that the process can be conducted by an apparatus which is considerably simpler in structure than an apparatus which would be required for carrying out an acetone washing. Further, there is no risk of a pollution of the ethylene by the acetone. As compared with a hydration of the acetylene this invention has considerable advantages since the ethylene is not polluted by hydrogen and the yield in ethylene is very high. Also, the acetylene can be obtained in a high concentration of any desired degree and eventually in its pure condition.

It may be desired, for reasons of safety, to ensure against the occurrence of explosion to carry out the rectification in the second column in such a way, that no pure acetylene will be obtained. Accordingly, a pure concentration of acetylene can be obtained by a subsequent washing of the acetylene with a suitable solvent such as acetone. The quantity of solvent which would be required is considerably smaller than that required in known processes in scrubbing the total quantity of gas.

The second rectification column can also be connected with a second-or a third-stage rectification column of the type which is known in the art. The operating pressure in the secondary column is preferably higher than 1.3 atmospheres in order to avoid any consolidation of the acetylene.

Figure 2:
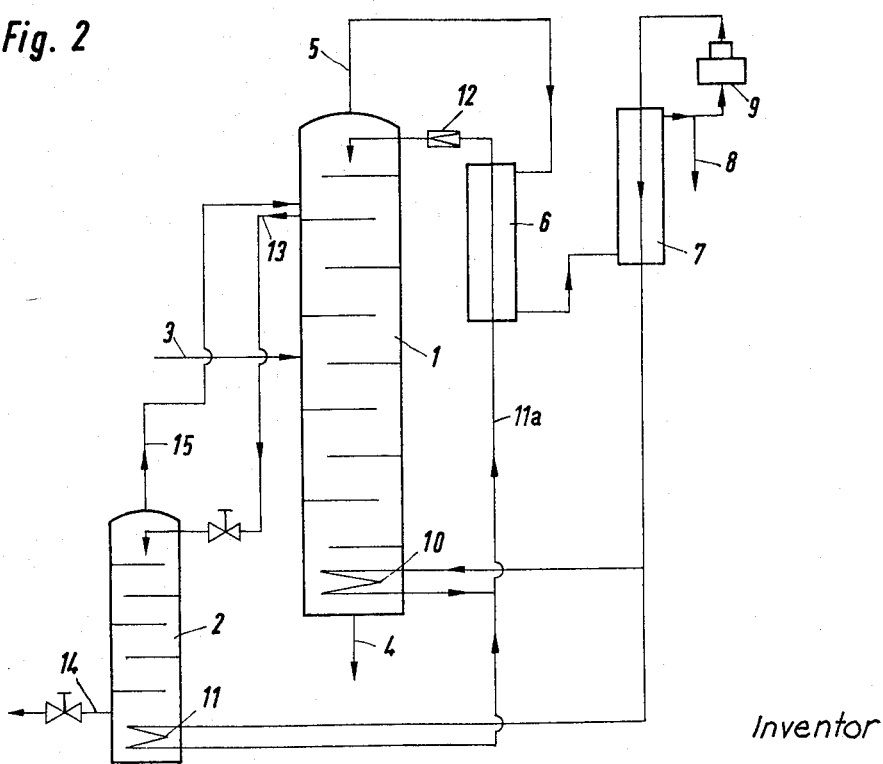
Figure 3:
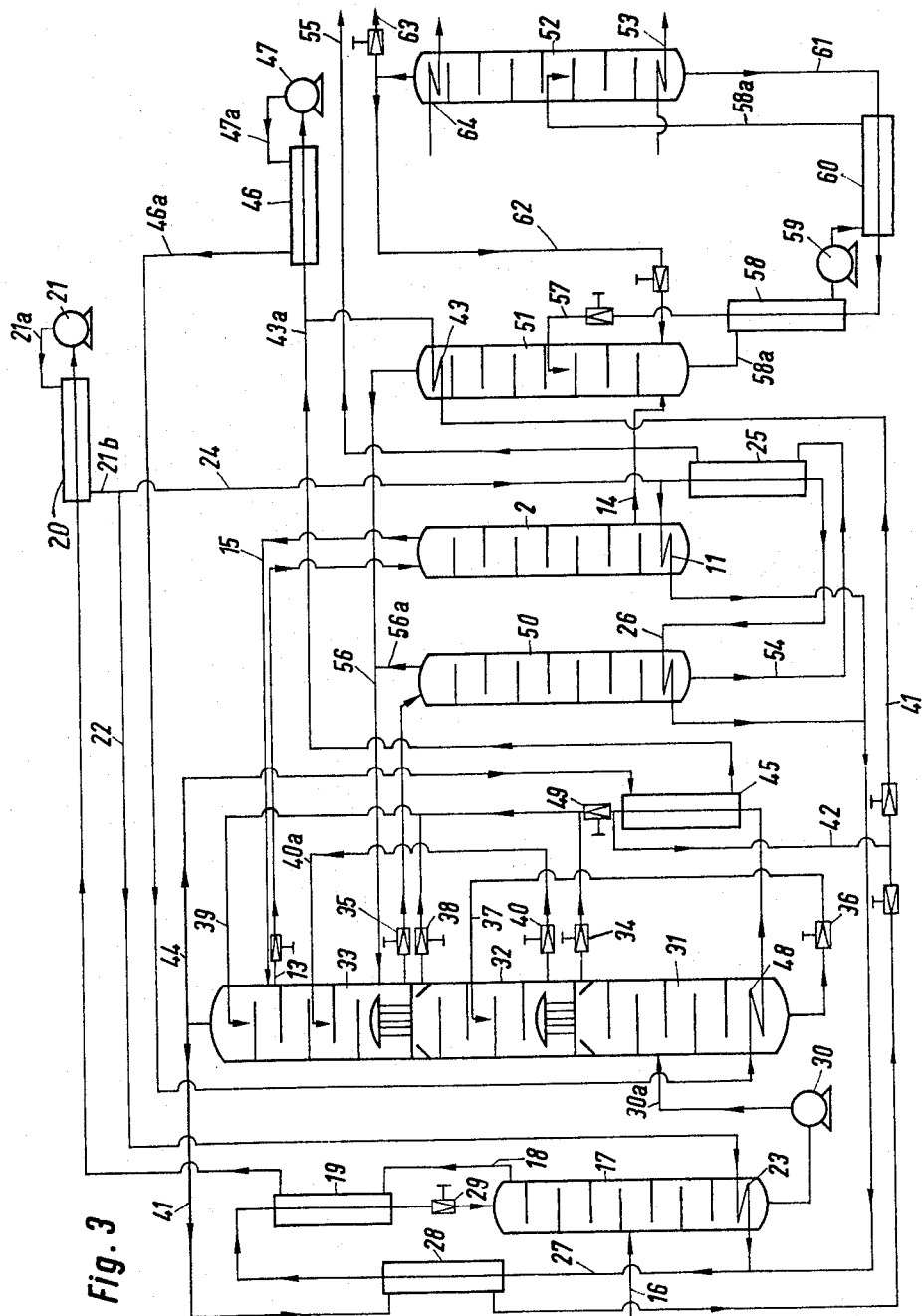

Other objects and advantages of this invention will be apparent upon reference to the accompanying description when taken in conjunction with the following drawings, wherein FIGURE 1 is only a schematic representation of a graph showing the equilibrium composition of a liquid and vapor in an ethane-acetylene mixture at a given pressure;

FIGURE 2 is a diagrammatic representation of the apparatus according to this invention for producing a pure acetylene; and FIGURE 3 is a diagrammatic representation of an apparatus for the separation of crude ethylene and the production of a highly enriched acetylene which is subsequently washed with acetone.

The description of the process and apparatus of this invention can be clarified by reference to FIGURE 1 which schematically shows an equilibrium curve for an ethane-acetylene mixture. The abscissa represents the proportion of acetylene in the liquid form and the ordinate represents the proportion of acetylene in the vapor form. These proportions are represented in percent by volume. The straight line B indicates all points where the liquid and the vapor have the same composition. The intersection of the two curves at the point C indicates the azeotropic point of the ethane-acetylene mixture.

Proceeding to FIGURE 2, an apparatus for carrying out this invention will be described. There is indicated by 1 the main rectification column and the secondary rectification column is indicated at 2. A supply conduit 3 is connected to the column 1 between the top and bottom thereof. The column 1 has a discharge conduit 4 extending from the sump thereof.

There is a line 5 which extends from the top of the column 1 and serially connects heat exchangers 6 and 7. A line 8 is provided to tap ethylene after it emerges through the heat exchanger 7. A compressor 9 is connected to the heat exchanger 7. Heating devices 10 and 11, which are located in the sumps of the columns 1 and 2, respectively, are connected to the compressor 9. The heating devices 10 and 11 are then connected to a line 11a which passes through the heat exchanger 6 and has an expanding valve 12 therein. The line 11a is then introduced into the top of the column 1.

A conduit 13 extends from the column 1 to form a tap and the conduit 13 is introduced into the upper portion of the column 2. A line 14 is provided to tap acetylene from the column 2. The gaseous products discharged from the column 2 pass through a line 15 to be reintroduced into the column 1 at a point near the connection of the conduit 13 with the column 1.

In the process of this invention, utilizing the apparatus of FIGURE 2, an ethane-acetylene-ethylene-mixture is introduced through the supply line 3 under a pressure of about 1.3 atmospheres into the rectification column 1. This mixture is separated into ethane and ethylene. The ethane is then discharged as a liquid through the line 4, and the ethylene emerges through the line 5 and is heated in the heat exchangers 6 and 7. A portion of the ethylene is withdrawn from the conduit 8. The remaining portion is compressed in the compressor 9. The compressed ethylene is subsequently cooled in the heat exchanger 7 and condensed in the heating devices 10 and 11, whereby the sump liquid is vaporized in the columns 1 and 2. The resulting liquid ethylene is further cooled in the heat exchanger 6, expanded in the valve 12 and introduced into the top of the column 1 as a washing liquid.

A liquid $C_2$ hydrocarbon mixture is tapped from column 1 through the conduit 13. This liquid mixture comprises 98% of ethylene, 0.8% of ethane and 1.2% of acetylene. The composition of this mixture is such that a point on the equilibrium curve A in FIGURE 1, which corresponds to this composition, is positioned above the point C. This mixture is introduced into the upper portion of the column 2 in which it is rectified. A strongly enriched or pure acetylene is withdrawn through the conduit 14 from the column 2. A gaseous $C_2$ hydrocarbon mixture is discharged from the top of the secondary column 2 through the conduit 15. A portion of the acetylene has been removed from this gaseous hydrocarbon mixture but otherwise the composition of this mixture is similar to that of the tapped liquid mixture. This mixture is introduced into the column 1 at approximately the same point from which the liquid mixture was tapped through the conduit 13.

Proceeding next to FIGURE 3 there is illustrated a modification of this invention wherein crude ethylene is separated and in which only a highly enriched acetylene is tapped from the acetylene column with the acetylene being subsequently washed with acetone.

In this modification a supply conduit 16 leads to a rectification column 17. A conduit 18 extends from the top of the column 17 through heat exchangers 19 and 20 and then to a compressor 21. The discharge of the compressor 21 is connected to the heat exchanger 20 through a line 21a and emerges through heat exchanger 20 through a line 21b which is branched into conduits 22 and 24.

The conduit 22 is connected to a heating device 23 which is positioned in the sump of the column 17.

The other branched line 24 passes through a heat exchanger 25, through a heating device 26, located in the sump of a column 50, and then to line 27. The line 27 passes through a heat exchanger 28 and the heat exchanger 19, previously described, from which it is passed through an expanding valve 29 and is introduced into the top of the column 17.

A pump 30 has its inlet connected with the sump of the column 17 and its outlet connected to a line 30a which leads to a column 31. The column 31 is the lower stage of a three-stage rectification column comprising the stages 31, 32 and 33. A valve 34 is connected to the top of the column 31 for withdrawing ethylene therefrom. There is a withdrawing valve 35 connected to the sump of the column 33 and a tapping valve 36 connected to the sump of the column 31. The valve 36 is connected through a line 37 to an intermediate point of the column 32.

A withdrawing valve 40 is connected to the sump of the column 32 and to a line 40a which is introduced into the intermediate portion of the column 33.

A line 41 leads from the top of the column 33 through a heat exchanger 28 and to a cooling device 43 located in the top portion of a column 51. The cooling device 43 connects to a line 43a.

A line 42 connects a line 39 with the line 41.

A conduit 44 branches from the line 41 and passes to a heat exchanger 45 which is connected through line 43a to heat exchanger 46 and a compressor 47. The output of the compressor 47 is passed through a discharge line 47a countercurrently from the heat exchanger 46 through which it emerges through line 46a which connects to a heating device 48 located in the sump of the column 31. The heating device 48 then connects through line 39 which has an expanding valve 49 therein. The line 42 previously mentioned is connected to the line 39 between the expanding valve 49 and the heat exchanger 45.

There is a plurality of rectification columns 50, 51 and 52 with there being a heating device 53 mounted in the sump of the column 52.

A discharge line 54 extends from the sump of the column 50 and it connects to the heat exchanger 25 from which emerges line 55 through which the heated sump product is discharged.

A gas discharge line 56 extends from the top of the column 51 and connects to column 33. The top of the column 50 is connected to the line 56 through a line 56a.

Acetone is supplied to the column 51 through a conduit 57 which has been cooled in a heat exchanger 58. The heat exchanger 58 is connected with the sump of the column 51 by a line 58a which line also connects pump 59 to a heat exchanger 60. The line 58a further continues to be introduced into the column 52. A discharge line 61 extends from the sump of the column 52 and passes countercurrently through the heat exchanger 60 to connect to the acetone supply line 57.

A gaseous acetylene supply line 62 leads from the top of the column 52 to the sump of the column 51. A portion of the acetylene removed from the column 52 may be tapped from the installation through the discharge line 63. The top of the column 52 is cooled by a cooling device 64.

In conducting the process of this invention to produce only an enriched acetylene, crude ethylene is supplied through conduit 16 into the column 17 within which it is separated into methane which is tapped therefrom by the conduit 18 and heated in the heat exchanger 19. Subsequently, this methane is heated in countercurrent flow with itself in the heat exchanger 20, is compressed in the compressor 21 and then emerges through the line 21b from which it is divided into branch lines 22 and 24.

The methane flowing through the conduit 24 is again divided into one portion which flows through the heating device 11 in the bottom of the column 2 and into another portion which flows through the heat exchanger 25 into a heating device 26 in the bottom of the column 50 wherein the methane is also condensed. The condensates formed in the heating devices 11, 26 and 23 are combined in the conduit 27, cooled in the heat exchangers 28 and 19 and introduced as washing liquid into the top of the column 17 after having been expanded in the valve 29.

A C$_2$ hydrocarbon mixture at a temperature of approximately 185° K. and free from methane is tapped from the sump of the column 17 under a pressure of approximately 1.5 atmospheres. This hydrocarbon mixture is introduced into the pump 30 within which it is compressed to a pressure of about 4.5 atmospheres, which is substantially the pressure prevailing in the column 31.

The liquid product accumulating in the bottom of the column 31 is tapped through the line 37 which is provided with the valve 36 and then introduced into the column 32. The column 32 is under a pressure of approximately 2.7 atmospheres.

The ethylene in the top of the column 32 is tapped through the valve 38 and is expanded to the pressure prevailing in the column 33. This ethylene is combined with the head product of column 31 which has been expanded in the valve 34 and introduced through the conduit 39 into the top of column 33 as a reflux liquid.

The sump liquid of column 32 is tapped through valve 40, expanded, and introduced into an intermediate point of column 33 through the line 40a. Gaseous ethylene is tapped from the top of column 33 with a portion of this ethylene being conducted through conduit 41 and a portion through conduit 44. The gaseous ethylene in the conduit 41 is heated in the heat exchanger 28, combined with ethylene introduced through conduit 42 and conducted through the cooling device 43 in the head of the column 51.

The gaseous ethylene in the conduit 44 is heated in the heat exchanger 45 and together with the ethylene coming from the cooling device 43 is heated in the heat exchanger 46, compressed in the compressor 47 and then cooled in countercurrent flow with itself in the heat exchanger 46. The cooled ethylene is partially condensed in the heating device 48 and conducted through the heat exchanger 45. Emerging from the heat exchanger 45 the ethylene is divided into one portion which is conducted to the line 41 through the conduit 42 and into another portion which is expanded in valve 49 and is introduced as a washing liquid in the column 33 through the line 39.

The sump liquid of the column 33 is tapped through the valve 35 and introduced into the top of the ethane column 50 which is under a pressure of approximately 1.5 atmospheres. The sump product of the column 50 consists of ethane which is tapped through conduit 54, heated in the heat exchanger 25 and discharged from the installation through the conduit 55. The gaseous head product of the ethane column 50 is withdrawn through the line 56a and introduced into the line 56 through which it is conducted into the column 33.

A liquid C$_2$ hydrocarbon mixture is tapped from column 33 through the line 13. This liquid mixture consists essentially of ethylene, and contains approximately as much acetylene, and at the maximum seven times as much acetylene, as it contains ethane. This liquid mixture is introduced into column 2 wherein it is rectified. The resulting sump product is enriched with acetylene and is tapped through line 14. The gaseous head product is withdrawn from the column 2 through the line 15 and reconducted into the column 33 at substantially the same point at which the liquid mixture was withdrawn therefrom through the line 13. The composition of this gaseous head product corresponds approximately to that of the mixture introduced into the liquid state with, however, the acetylene content being reduced by the quantity of the separated acetylene.

The acetylene-enriched mixture is introduced into the column 51 through the line 14. This mixture is washed with acetone supplied to the conduit 57. Gaseous impure ethane and ethylene will escape from the top of the column 51 through the line 56. The washing solution which is now charged with acetylene is tapped from the bottom of column 51, heated in the heat exchanger 58 and compressed in the pump 59 to a pressure of about 2 atmospheres, which is the pressure prevailing in the regenerating column 52. The washing solution is further heated in a heat exchanger 60 and introduced into the column 52 at an intermediate point.

The sump of the column 52 is heated to approximately 80° C. by the heating device 53 and the top of the column is cooled by the cooling device 64 to a temperature of about 32° C. Regenerated, pure acetone is then tapped from the bottom of the column 52 through line 61, cooled in the heat exchangers 60 and 58, expanded and introduced as a washing liquid into the column 51 through the conduit 57.

The gaseous pure acetylene which is withdrawn from the top of the column 52 has a portion thereof introduced into the sump of the column 51 to heat the same and a portion thereof tapped from the installation through the conduit 63.

Thus it can be seen that the present invention discloses a simplified process and apparatus for separating ternary mixtures by means of a rectification at low temperature in order to obtain ethane and ethylene which is free from acetylene.

It will be understood that this invention is susceptible to further modification and, accordingly, it is desired to comprehend such modifications within this invention as may fall within the scope of the appended claims.

What is claimed as this invention is:

1. A process for separating a C$_2$ hydrocarbon ternary mixture of ethane, ethylene and acetylene, which process comprises the steps of:
   (1) rectifying said ternary mixture in a first distillation column and withdrawing therefrom a bottoms product fraction consisting essentially of ethane, an overhead product fraction consisting essentially of ethylene, and a side stream consisting of ethylene in a preponderant amount, and acetylene and ethane in a ratio of 1:1 to 7:1 respectively;
   (2) rectifying said side stream in a second distillation column and withdrawing therefrom a bottoms fraction highly enriched in acetylene and an overhead fraction; and
   (3) recycling said overhead fraction from the second distillation column to a point in the first distillation column near the point at which said side stream is withdrawn.

2. The process of claim 1 wherein the overhead fraction from the second distillation column is returned to the first distillation column at substantially the same point where the side stream is withdrawn.

3. The process of claim 1 wherein the side stream consists essentially of 98% ethylene, 0.8% ethane and 1.2% acetylene.

4. The process of claim 1 wherein the C$_2$ hydrocarbon mixture to be separated is obtained from the rectification of a gaseous mixture selected from the group consisting of coke-oven gas, thermally cracked gas, and converter gas.

5. A process for separating a C$_2$ hydrocarbon ternary mixture of ethane, ethylene and acetylene, said mixture being obtained by the rectification of a gaseous mixture selected from the group consisting of coke-oven gas, thermally cracked gas, and converter gas, which process comprises the steps of:
   (1) rectifying said ternary mixture in a first distillation column and withdrawing therefrom a bottom product fraction consisting essentially of ethane, an overhead product fraction consisting essentially of ethylene, and a side stream consisting of ethylene in a preponderant amount, and acetylene and ethane in a ratio of 1:1 to 7:1 respectively.
   (2) rectifying said side stream in a second distillation column and withdrawing therefrom a bottoms fraction highly enriched in acetylene and an overhead fraction; and (3) recycling said overhead fraction from the second distillation column to the first distillation column at substantially the same point where the side stream is withdrawn.

6. The process of claim 5 wherein the side stream consists essentially of 98% ethylene, 0.8% ethane, and 1.2% acetylene.

7. A process for separating a $C_2$ hydrocarbon ternary mixture of ethane, ethylene and acetylene, which process comprises the steps of:
   (1) rectifying said ternary mixture in a first distillation column and withdrawing therefrom a bottoms product fraction consisting essentially of ethane, an overhead product fraction consisting essentially of ethylene, and a side stream consisting of ethylene in a preponderant amount, and acetylene and ethane in a ratio of 1:1 to 7:1, respectively;
   (2) rectifying said side stream in a second distillation column and withdrawing therefrom a bottoms fraction highly enriched in acetylene and an overhead fraction;
   (3) recycling said overhead fraction from the second distillation column to a point in the first distillation column near the point at which said side stream is withdrawn; and
   (4) washing enriched acetylene bottoms fraction from the second distillation column with a solvent to obtain pure acetylene.

8. A process for separating a $C_2$ hydrocarbon ternary mixture of ethane, ethylene, and acetylene, which process comprises the steps of:
   (1) rectifying said ternary mixture in a first distillation column and withdrawing therefrom a bottoms product fraction consisting essentially of ethane, an overhead product fraction consisting essentially of ethylene, and a side stream consisting of ethylene in a preponderant amount, and acetylene and ethane in a ratio of 1:1 to 7:1, respectively;
   (2) rectifying said side stream in a second distillation column and withdrawing therefrom an overhead fraction and a bottoms fraction containing acetylene in a concentration range of from enriched acetylene to pure acetylene, with the provision that said first distillation column bottoms fraction consisting essentially of ethane is not fed to said second distillation column; and
   (3) recycling said overhead fraction from the second distillation column to a point in the first distillation column near the point at which said side stream is withdrawn.

References Cited by the Examiner
UNITED STATES PATENTS

| | | | |
|---|---|---|---|
| 2,582,443 | 1/1952 | Linn | 55—63 |
| 2,715,604 | 8/1955 | Weaver | 203—98 |
| 2,717,232 | 9/1955 | Geller et al. | 202—154 |
| 2,817,216 | 12/1957 | Etienne | 62—28 |
| 2,901,404 | 8/1959 | Kirshenbaum et al. | 202—154 |
| 2,909,576 | 10/1959 | Fenske et al. | 260—674 |
| 3,004,629 | 10/1961 | Cottle | 55—64 X |
| 3,073,129 | 1/1963 | Grenier | 62—28 |
| 3,087,310 | 4/1963 | Rottmayr | 62—28 |
| 3,091,095 | 5/1963 | Linde | 62—28 |

NORMAN YUDKOFF, *Primary Examiner.*

MILTON STERMAN, *Examiner.*

W. L. BASCOMB, M. H. SILVERSTEIN,
*Assistant Examiners.*